United States Patent
Mueller

(10) Patent No.: US 8,228,691 B2
(45) Date of Patent: Jul. 24, 2012

(54) METHOD AND SYSTEM FOR INDUCTIVELY TRANSMITTING ENERGY AND INFORMATION

(75) Inventor: Horst Mueller, Rott am Inn (DE)

(73) Assignee: Odu Steckverbindungssysteme GmbH & Co. KG, Muehldorf A. Inn (DE)

( * ) Notice: Subject to any disclaimer, the term of this patent is extended or adjusted under 35 U.S.C. 154(b) by 525 days.

(21) Appl. No.: 12/510,328

(22) Filed: Jul. 28, 2009

(65) Prior Publication Data

US 2010/0187909 A1 Jul. 29, 2010

(30) Foreign Application Priority Data

Jul. 29, 2008 (EP) .................................. 08161351

(51) Int. Cl.
*H02M 3/335* (2006.01)
(52) U.S. Cl. ............................................................ 363/17
(58) Field of Classification Search .................... 363/17, 363/56.03, 89, 98
See application file for complete search history.

(56) References Cited

U.S. PATENT DOCUMENTS

| | | | |
|---|---|---|---|
| 5,701,121 A | 12/1997 | Murdoch | |
| 5,821,632 A | 10/1998 | Normann et al. | |
| 6,301,128 B1 * | 10/2001 | Jang et al. | 363/17 |
| 6,426,884 B1 * | 7/2002 | Sun | 363/17 |
| 6,940,738 B2 * | 9/2005 | Huang et al. | 363/127 |
| 7,551,066 B1 | 6/2009 | Burger | |
| 7,848,118 B2 * | 12/2010 | Shimada et al. | 363/17 |

FOREIGN PATENT DOCUMENTS

| | | |
|---|---|---|
| GB | 2198014 | 6/1988 |
| GB | 2198014 | 6/1998 |
| JP | 2000-198420 | 7/2000 |
| JP | 2002-516438 | 6/2002 |
| JP | 2006-108833 | 4/2006 |
| WO | 94/01846 | 1/1994 |
| WO | 9960509 | 11/1999 |

OTHER PUBLICATIONS

Notice of Reason for Refusal for Japanese Patent Application No. 2009-176977.
English translation of Notice of Reason for Refusal for Japanese Patent Application No. 2009-176977.
European Search Report for Counterpart patent application.

* cited by examiner

*Primary Examiner* — Jeffrey Sterrett

(57) ABSTRACT

A method of inductively transmitting energy and information between an energy transmitter comprising a primary inductor and an energy receiver comprising a secondary inductor, wherein energy is transmitted from the energy transmitter to the energy receiver by applying an alternating voltage to the primary inductor to generate a primary alternating current in the primary inductor, thereby inducing a secondary alternating current in the secondary inductor. The information is transmitted from the energy transmitter to the energy receiver essentially only in a dedicated first section of the cycle of the alternating voltage by varying the amplitude of the alternating voltage; and information is transmitted from the energy receiver to the energy transmitter essentially only in a dedicated second section of the cycle by varying the secondary inductor's power absorption, the second section not overlapping with the first section.

18 Claims, 2 Drawing Sheets

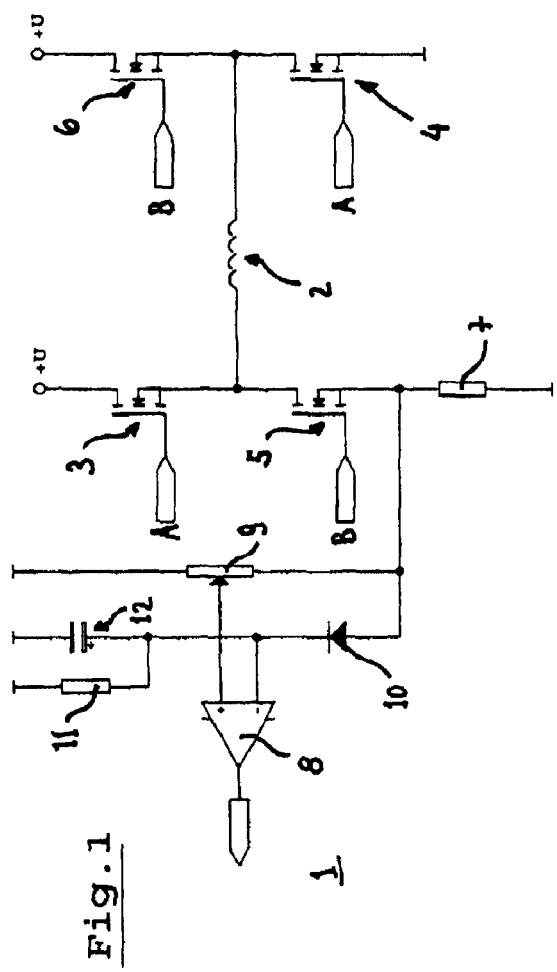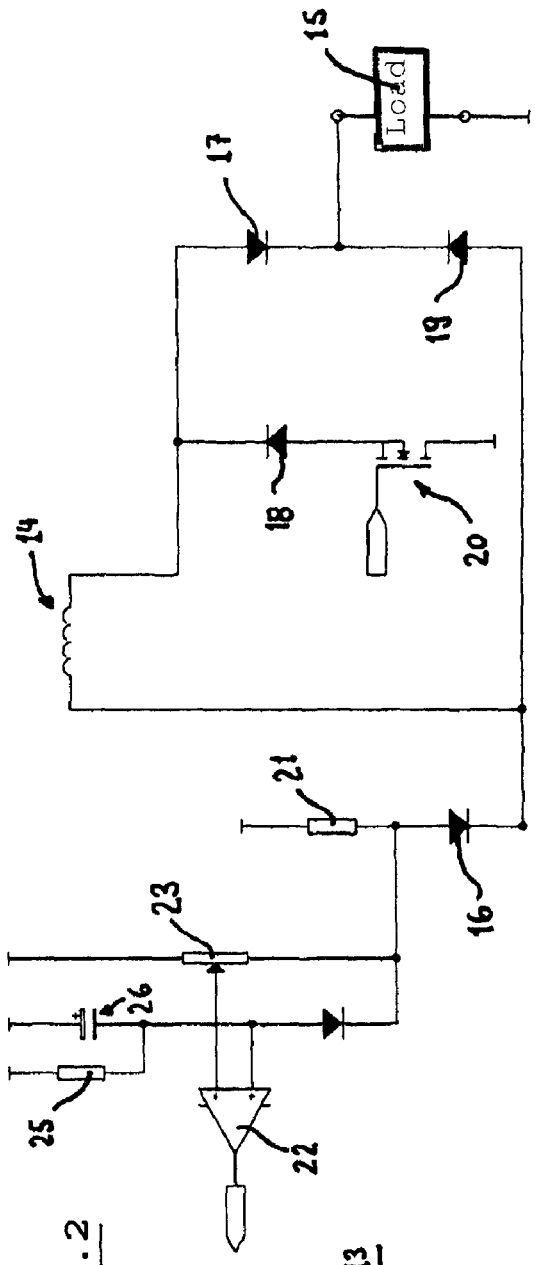
Fig.1
Fig.2

METHOD AND SYSTEM FOR INDUCTIVELY TRANSMITTING ENERGY AND INFORMATION

BACKGROUND

From the U.S. Pat. No. 5,701,121 a system is known comprising an interrogator and a transducer between which information and energy can be transmitted by means of coupled oscillating circuits. The interrogator's magnetic field can be picked up by the transducer to provide energy to an electrical device attached to the transducer. Moreover, data and commands are transmitted between interrogator and transducer by means of modulating the induction field. For transmission from the interrogator to the transducer, i.e. in the direction of energy transmission, amplitude, phase, frequency and pulse modulation are suggested. For transmission in the opposite direction, "power absorption"-signalling is suggested, in which the receiving coil of the transducer is temporarily disconnected, which disconnection is detected at the location of the interrogator by means of monitoring the energy absorption of the energy-transmitting coil.

The international patent publication WO 1994/001846 A1 discloses an electrical connector that comprises of a transformer for inductively transmitting electrical power and information. The connector preferably is integrated into a hinge-joint for the door of a car. Via the connector, electrical power is transmitted from the car to the door to supply a load in the door with electrical energy, and data is transmitted by-directionally. The primary side of the transformer is provided by an H-bridge circuit with a square wave voltage. For transmission of a low frequency signal in the direction of power transmission to drive loud speakers and the door, the pulse of the square wave voltage is HF-modulated. Moreover, information is transmitted in both directions by HF-modulating of the square wave signal, beginning with the rising edges.

SUMMARY

The present invention concerns a method of inductively transmitting energy and information between an energy transmitter comprising a primary inductor and an energy receiver comprising a secondary inductor, wherein energy is transmitted from the energy transmitter to the energy receiver by applying an alternating voltage to the primary inductor to generate a primary alternating current in the primary inductor, thereby inducing a secondary alternating current in the secondary inductor. The invention also concerns an energy transmitter comprising a primary inductor that can be coupled inductively to a an energy receiver's secondary inductor for inductively transmitting energy to the energy receiver and receiving information from the energy receiver, the energy transmitter comprising means for applying an alternating voltage to the primary inductor for generating a primary alternating current in the primary inductor so that the primary alternating current can induce a secondary alternating current in the secondary inductor, wherein the means for applying an alternating voltage to the primary inductor comprise means for applying a positive voltage across the primary inductor and means for applying a negative voltage across the primary inductor. The invention further concerns an energy receiver comprising a secondary inductor that can be coupled inductively to an energy transmitter's primary inductor for inductively receiving energy and information from the energy receiver, the energy receiver comprising a rectifier for rectifying a secondary alternating current induced into the secondary inductor by the primary inductor. Finally, the invention concerns a system comprising an energy transmitter and an energy receiver.

It is an objective of the present invention to provide an improved method of inductively transmitting energy and information between an energy transmitter and an energy receiver. It is a further objective of the present invention to provide an improved energy transmitter, an improved energy receiver and an improved system for information exchange between an energy transmitter and an energy receiver.

A method of inductively transmitting energy and information between an energy transmitter comprising a primary inductor and an energy receiver comprising a secondary inductor, wherein energy is transmitted from the energy transmitter to the energy receiver by applying an alternating voltage to the primary inductor to generate a primary alternating current in the primary inductor, thereby inducing a secondary alternating current in the secondary inductor, and wherein information is transmitted from the energy transmitter to the energy receiver essentially only in a dedicated first section of the cycle of the alternating voltage by varying the amplitude of the alternating voltage; and information is transmitted from the energy receiver to the energy transmitter essentially only in a dedicated second section of the cycle by varying the secondary inductor's power absorption, the second section not overlapping with the first section.

The term "alternation" refers to the parts of an alternating voltage or an alternating current with the same sign. Alternations are delimited by the zero points of the voltage or current. The voltage and the currents thus have two alternations, one arbitrarily termed "positive" and the other termed "negative". In the following, the terms "positive" and "negative" are used to identify corresponding alternations of the voltages and currents, i.e. a "positive" alternation of the secondary current is considered an alternation that has been induced by a "positive" alternation of the primary current, which has been induced by a "positive" alternation of the alternating voltage.

It is an achievable advantage of the invention that by dedicating sections of the cycle exclusively for transmission of information in one particular direction, transmission of information in one direction can never coincide with transmission of information in the other direction. Thus, interference of signals transmitting in one direction with signals transmitting in the opposite direction can be avoided. Moreover, the construction of the device can be simplified.

The problem is further solved by an energy transmitter comprising a primary inductor that can be coupled inductively to a an energy receiver's secondary inductor for inductively transmitting energy to the energy receiver and receiving information from the energy receiver, the energy transmitter comprising means for applying an alternating voltage to the primary inductor for generating a primary alternating current in the primary inductor so that the primary alternating current can induce a secondary alternating current in the secondary inductor, wherein the means for applying an alternating voltage to the primary inductor comprise means for applying a positive voltage across the primary inductor and means for applying a negative voltage across the primary inductor, and wherein the means for applying a negative voltage across the primary inductor are provided with means for detecting variations in the power absorption of the secondary inductor to pick up information transmitted from the energy receiver to the energy transmitter.

The energy transmitter according to the invention exploits the fact that if the dedicated second section for transmission of information from the energy receiver to the energy transmitter is located in the negative alternation of the cycle, it is sufficient to provide the means for applying a negative voltage across the primary inductor with mean for detecting variations in the power absorption of the secondary inductor. Advantageously, this allows for a simple construction of the energy transmitter and energy receiver.

Moreover, the problem is solved by an energy receiver comprising a secondary inductor that can be coupled inductively to an energy transmitter's primary inductor for inductively receiving energy and information from the energy transmitter, the energy receiver comprising a rectifier for rectifying a secondary alternating current induced into the secondary inductor by the primary inductor, wherein the circuitry of the rectifier passing the positive alternation of the secondary alternating current is provided with means for detecting variations in the secondary alternating current.

The energy receiver according to the invention exploits the fact that variations in the amplitude of the alternating voltage applied to the primary inductor entail variations in the primary alternating current which entail variations in the secondary alternating current. Thus, by detecting variations in the secondary alternating current, information transmitted from the energy transmitter to the energy receiver can be picked up. Moreover, the energy receiver according to the invention exploits the fact that if the dedicated first section for transmission of information from the energy receiver to the energy transmitter is located in the positive alternation of the cycle, it is sufficient to provide the circuitry of the rectifier passing the positive alternation of the secondary alternating current with the means for detecting variations in the secondary alternating current. Advantageously, this allows for a simple construction of the energy receiver and the energy transmitter.

Finally, the problem is solved by a system comprising the energy transmitter and the energy receiver according to the invention.

Preferred features of the invention which may be applied alone or in combination are discussed in the dependent claims.

The inductors preferably are coils of a conducting material, preferably metal such as silver or copper. Preferably, the primary and secondary inductors are coupled by means of a common metal core. In a preferred embodiment of the invention, the core comprises two parts that can be combined to provide for a closed magnetic loop. Preferably, the primary inductor is provided with one of the parts of the core and the secondary inductor with the other part. The core preferably comprises iron, more preferably in the form of ferrite, or another ferromagnetic material, preferably a material of high magnetic permeability.

Preferably, the alternating voltage has a stepped wave form, the wave form essentially comprising a square-shaped positive alternation and a square-shaped negative alternation. Preferably, adjacent alternations are separated by sections of zero voltage. In a preferred embodiment of the invention, the means for applying an alternating current to the primary inductor comprise an H-bridge circuit with two switches for applying a positive voltage across the primary inductor and two further switches for applying a negative voltage across the primary inductor. A suitable H-bridge circuit is disclosed in WO 1994/001846 A1, the respective content of this document being incorporated into the present disclosure by reference. The switches preferably are transistors, more preferably field effect transistors.

Preferably, the first section, i.e. the section for transmitting information from the energy transmitter to the energy receiver, is located in the positive alternation of the alternating voltage. Preferably, the second section is located in the negative alternation of the alternating voltage. It is an achievable advantage of these embodiments of the invention, that both the energy transmitter and the energy receiver can be constructed in a particularly simple straightforward manner.

In a preferred embodiment of energy transmitter, means for determining the current through primary inductor during the negative alternation of the alternating voltage are provided to pick up information transmitted from the energy receiver to the energy transmitter. This embodiment of the invention exploits the fact that variations in the power absorption of the secondary inductor can entail variations in the current through the primary inductor. Preferably, a first resistor is connected in series with one of the switches for applying a negative voltage across the primary inductor. By observing the voltage drop across the first resistor, a variation of the primary current in the negative alternation of the alternating voltage can be detected. More particularly, the voltage drop is compared to the average voltage drop of many repetitions of the cycle in order to compensate for slow changes ("slow" in the context of the present invention meaning slow compared to the cycle time of the alternating voltage) in a load connected with the primary inductor, which may also affect the voltage drop over the first resistor but are not related to the transmission of information.

In a preferred embodiment of the energy receiver, a second resistor is connected in series in the circuitry of the rectifier passing the positive alternation of the secondary alternating current. By observing the voltage drop across the second resistor, a variation of the current through the secondary inductor in the positive alternation of the secondary alternating current can be detected. This way information can be received from the energy transmitter. More particularly, as previously discussed with respect to the energy transmitter, in the energy receiver the voltage is compared to the average voltage drop of many repetitions of the cycle in order to compensate for slow changes in the load connected with the primary inductor, which may also affect the voltage drop over the second resistor but are not related to information transmission.

In a preferred embodiment of the energy receiver, the rectifier comprises at least one diode for rectification. A preferred rectifier is a bridge rectifier. The second resistor preferably is connected in series with one of the diodes of the rectifier. In a preferred embodiment of the invention, the load is connected with the secondary inductor, preferably via the rectifier. The second resistor preferably is connected in series with the load.

In one embodiment of the invention, for transmission of information from the energy receiver to the energy transmitter the power absorption of the secondary inductor is varied by temporarily disconnecting the load from the secondary inductor. Alternatively, a variation in power absorption can be achieved by increasing or reducing the load or even shortening the secondary inductor.

In a preferred embodiment of the energy receiver, the circuitry of the rectifier passing the negative alternation of the secondary alternating current is provided with means for varying the power absorption of the secondary inductor, preferably, means for disconnecting the load from the secondary inductor. Preferably, a switch is connected in series within the circuitry of the rectifier passing the negative alternation of the secondary alternating current. The switch preferably is connected in series with one of the diodes of the rectifier.

A preferred system comprising an energy transmitter according to the invention and an energy receiver according to the above embodiment exploits the fact that it is achievable that the negative alternation of the secondary current of the energy receiver essentially coincides with the negative alternation of the alternating voltage of the energy transmitter. Thus switching in the circuitry of the rectifier for the negative alternation of the secondary alternating current in the energy receiver can be detected by observing the voltage across the resistor provided in the means that apply a negative voltage across the primary inductor in the energy transmitter.

In a preferred embodiment of the invention, the first section is essentially the entire positive alternation of the alternating voltage. In other words, the amplitude of the entire positive alternation can vary between repetitions of the cycle to encode the information to be transmitted from the energy transmitter to the energy receiver. Preferably, in this embodiment of the invention, the variation of the voltage translates into a variation of the amplitude of the primary current which translates into a variation of the amplitude of the secondary current.

In a preferred embodiment of the invention, the second section is the entire negative alternation of the secondary alternating current. In other words, the power absorption of the secondary inductor throughout essentially the entire negative alternation of the alternating voltage is varied between repetitions of the cycle to encode the information to be transmitted from the energy receiver to the energy transmitter.

Alternatively to varying throughout the entire alternation, only sections may be varied. This can have the advantage that the transfer of energy is less affected by the transmission of information. In a preferred embodiment of the invention, the first section for transmission of information from the energy transmitter to the energy receiver is located at the end of the alternation of the alternating voltage, preferably the positive alternation. In other words, the amplitude of the alternating voltage at the end of the alternation can vary between repetitions of the cycle to encode the information to be transmitted from the energy transmitter to the energy receiver. The inventors have found that in the secondary inductor, variations at the end of an alternation in general can easily be detected, in particular if the alternating voltage has a stepped wave form, because the primary and secondary alternating currents in general reach a relatively high value towards the end of the alternation. Yet, in other embodiments of the invention, the first section may be located elsewhere in the alternation, e.g. at the beginning of the alternation.

Preferably, the length of the first section to be varied is less than ½ of the length of the alternation, more preferably less than ¼, more preferably less than ⅛, more preferably less than 1/16. It is possible to vary the length of the section to be varied to encode information representing values in a code with a base greater than 2. This way it is achievable to increase the speed of transmission by transmitting more information with the given number of alternations. The relative length of the section of 1, ½ and 0 may e.g. represent the value "0", "1" and "2" in a 3-base code.

In a preferred embodiment of the invention, the amplitude of the alternating voltage applied for the duration of the first section to the primary inductor is reduced, preferably to zero. As a result, preferably, the absolute value of the current in the primary inductor will fall, inducing a falling secondary current. It is an achievable advantage of this embodiment of the invention that such current drop can relatively easily be detected on the side of the secondary inductor. Moreover, a drop in the applied voltage to zero can easily be achieved by means of a switch. In this way, information can be transmitted in a binary code in which a zero voltage represents one value, e.g. "1" and a full voltage represents the other value, i.e. "0", in this example. Instead of a zero voltage, the absolute value of the voltage may only be reduced to a certain level to represent one value, e.g. "1", while a full voltage represents the other value.

In other embodiments of the invention the absolute value of the first section's voltage may be reduced in various degrees representing values in a code with a base greater than 2. This way it is achievable to increase the speed of transmission by transmitting more information with the given number of alternations. For example, relative voltages of 1, ½ and 0 may represent the values "0", "1" and "2" in a 3-base code. Preferably, variations in length are combined with variations in amplitude. This way the amount of transferred information per alternation can further be increased. For example, with three different lengths (l) and three different amplitudes (a), length amplitude-pairs (l; a) can encode five different values per alternation, namely "0"=(0; 0), "1"=(1; 0), "2"=(1; 1), "3"=(2; 0) and "4"=(2; 1).

In a preferred embodiment of the invention, the second section for transmission of information from the energy receiver to the energy transmitter is located at the beginning of an alternation of the secondary alternating current, preferably the negative alternation. In other words, the power absorption of the secondary inductor at the beginning of the alternation is varied between repetitions of the cycle to encode the information to be transmitted from the energy receiver to the energy transmitter. It is an achievable advantage of this embodiment of the invention that changes in the power absorption at the beginning of the cycle can be easily detected, in particular if the alternating voltage is a stepped wave form, because in general a change power absorption at the beginning of the alternation has a large effect on the primary and secondary currency and can therefore be detected easily. Yet, in other embodiments of the invention, the second section may be located elsewhere in the alternation, e.g. at the end of the alternation.

Preferably, the length of the second section to be varied is less than ½ of the length of the alternation, more preferably less than ¼, more preferably less than ⅛, more preferably less than 1/16. It is possible to vary the length of the section to be varied to encode information representing values in a code with a base greater than 2. This way it is achievable to increase the speed of transmission by transmitting more information with the given number of alternations. The relative length of the section of 1, ½ and 0 may e.g. represent the values "0", "1" and "2" in a 3-base code.

In a preferred embodiment of the invention, varying the secondary inductor's power absorption consist of essentially disconnecting the secondary inductor from the load for the duration of the second section. Thus, information can be transmitted in a binary code in which a disconnected load represents one value, e.g. "1" and a connected load represents the other value, i.e. "0", in this example. Instead of disconnecting the load altogether, the load may only be reduced to a certain level to represent one value, e.g. "1", while a full load represents the other value.

In other embodiments of the invention, the power absorption may be reduced in various degrees, representing values in a code with a base greater than 2. This way it is achievable to increase the speed of transmission by transmitting more information with the given number of alternations. For example, relative power absorptions of 1, ½ and 0 may represent the values "0", "1" and "2" in a 3-base code. Preferably, variations in power absorption are combined with variations in length. This way, as discussed previously in the context of information transmitted from the energy transmitter to the energy receiver, the amount of transferred information per alternation can be increased. For example, with different lengths (l) and three different power absorptions (a), length absorption-pairs (l, a) could encode five values per alternations.

In a preferred embodiment of the invention, the first section for transmission from the energy transmitter to the energy receiver is located at the end of a positive alternation of the alternating voltage and a second section for transmission from the energy receiver to the energy transmitter is located at the beginning of the negative alternation. This can have the advantage that the rising edge of the following positive alternation is essentially unaffected by the changes in current due to the variation of the second section. The edge can thus be used for synchronization of the encoding electronics on the primary and the secondary side.

BRIEF DESCRIPTION OF THE DRAWINGS

FIG. 1 shows a simplified circuit diagram of an energy transmitter according to the invention.

FIG. 2 shows a simplified circuit diagram of an energy receiver according to the invention.

DETAILED DESCRIPTION

Figure 3:
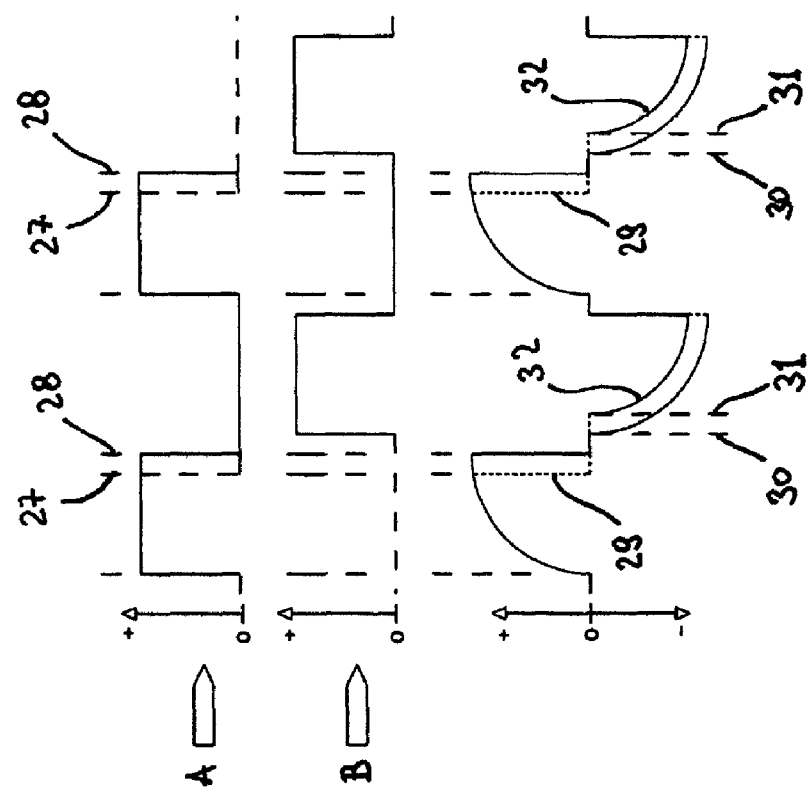
FIG. 3 shows in a simplified representation the signals applied to the transistors of an H-bridge of an energy transmitter according to the invention and the secondary current passing through the secondary inductor of an energy receiver according to the invention.

An embodiment of an energy transmitter 1 according to the invention is illustrated in FIG. 1 by means of a simplified circuit diagram. The energy transmitter 1 comprises a primary inductor 2 which is constructed as a coil of copper wire wrapped around a ferrite core (not shown). The primary inductor 2 is driven by four transistors 3, 4, 5, 6, which together form an H-bridge. Transistors 3 and 4 are provided with a square wave signal A as shown in the top row of FIG. 3 to generate the positive alternation of an alternating voltage applied to the primary inductor 2. The negative alternation of the alternating voltage is generated by transistors 5 and 6, which for this purpose are supplied with another square wave B shown in the second row in FIG. 3. The transistors are in a conducting state when the corresponding signal is positive and in a non-conducting state if the corresponding signal is zero. Thus, the resulting alternating voltage is a stepped signal of square-shaped positive and negative alternations separated by short sections of zero voltage.

Moreover, a first resistor 7 is connected in line with one 5 of the transistors generating the negative alternation of the alternating voltage. A first detection circuitry is provided to observe the voltage across the first resistor 7, which voltage is an indication of a current that passes through the primary inductor 2 during the negative alternation of the alternating voltage. In the first detection circuitry, a first comparator 8 compares a voltage derived via the voltage divider 9 from the voltage drop across the first resistor 7 with an average voltage derived by means of a first integrator circuitry from the voltage across the first resistor 7 averaged over many cycles. The first integrator circuitry comprises a diode 10, connected in series with a parallel connection of a resistor 11 and a capacitor 12.

An embodiment of an energy receiver 13 according to the invention is illustrated in FIG. 2 by means of a simplified circuit diagram. It comprises a secondary inductor 14 constructed as a coil of copper wire and wrapped around a ferrite core (not shown). For transmission of energy from the energy transmitter 1 to the energy receiver 3 and for bi-directionally exchanging information between the energy transmitter 1 and the energy receiver 3, the primary inductor 2 and the secondary inductor 14 can be inductively coupled by coupling the cores. A load 15 is connected to the secondary conductor 14 via a bridge rectifier, the bridge rectifier comprising four diodes 16, 17, 18, 19. The positive alternation of an alternating current induced into the secondary inductor 14 by the primary inductor 2 can pass through diodes 16 and 17, while the negative alternation can pass through the diodes 18 and 19. A transistor 20 is connected in line with one 18 of the diodes through which the negative alternation of the alternating current passes. The transistor 20 can temporarily disconnect the load 15 from the secondary inductor 14 during negative alternations of the alternating currents in order to transmit information from the energy receiver to the energy transmitter, which information can be detected by the previously described detection circuitry of the energy transmitter.

Moreover, one 16 of the diodes through which the positive alternation of the alternating current passes is connected in series with a second resistor 21. A second detection circuitry is provided to observe the voltage across the second resistor 21, which voltage is an indication of the current that passes through the secondary inductor 14 during the positive alternation of the secondary alternating current. In the second detection circuitry, a second comparator 22 compares a voltage derived via the voltage divider 23 from the voltage drop across the second resistor 21 with an average voltage derived by means of a second integrator circuitry from the voltage across the second resistor 21 averaged over many cycles. The second integrator circuitry comprises a diode 24, connected in series with a parallel connection of a resistor 25 and a capacitor 26.

The transmission of information between the energy transmitter and the energy receiver is now explained with the aid of FIG. 3. This figure shows in the first row the square wave signal A controlling transistors 3 and 4, in the second row the square wave signal B controlling transistors 5 and 6, and in the last row the secondary alternating current induced into the secondary inductor 14 by the primary current, which in turn is generated in the primary inductor 2 by the alternating voltage produced by the H-bridge 3, 4, 5, 6 in response to the square wave signals A and B. The square wave signals can for example be generated by a microprocessor (not shown).

For transmission of information from the energy transmitter 1 to the energy receiver 13, a first section (delimited by dashed lines 27 and 28 in FIG. 3) at the end of the positive alternation of the alternating voltage is varied. For this purpose, the square wave signal A generating the positive alternation of the alternating voltage throughout the first section either is positive or zero. Correspondingly, the positive alternation of the alternation current in the first section is either positive or zero. The latter case can also be understood as a "shortening" of the positive alternation. If the primary voltage in the first section is zero, the corresponding primary current (not shown) and thus also the secondary current rapidly fall to zero during the first section (indicted in the bottom row of FIG. 3 by the dotted line 29 in the first section). If the primary voltage, on the other hand, remains positive, the secondary current continues to rise throughout the first section (indicted in the bottom row of FIG. 3 by the full line in the first section). Such differences in the secondary current during the first section can be detected by the second comparator 22 of the second detection circuitry in the energy receiver 13 and can then be interpreted, e.g. by a microprocessor, as binary information. A voltage drop during the first section, which corresponds to a zero voltage applied to the primary inductor of the energy transmitter, can e.g. represent the value "1" while a secondary current that continue to rise, corresponding to a positive voltage across the primary inductor, can be interpreted as the value "0" in a two-base code.

For transmission of information from the energy receiver 13 to the energy transmitter 1, the switch 20 is opened for the interval of a second section (delimited by dashed lines 30 and 31 in FIG. 3) at the beginning of the negative alternation. As a result, the current passing through the secondary inductor is reduced throughout the remaining negative alternation (indicated by reference numeral 32), which results in a corresponding reduction in the current passing through the primary inductor 2 of the energy transmitter 1. Such differences in current can be detected by the first comparator 8 of the first detection circuitry of the energy transmitter 1 and can be interpreted as binary information. For example, a reduced current can be interpreted as the value "1" and a not reduced current as the value "0" of a two-base code.

The first and second sections can be kept short enough to have only a negligible effect on the energy transmission. For this purpose, the lengths of the first and the second section can, e.g. be chosen to be 1/10 of the length of the corresponding alternation. If, however, the first and second alternations are chosen to be longer, e.g. in order to increase the interference resistance of the system, an appropriate code should be chosen to ensure that on average, the positive current passing through the inductors is approximately equal to the negative current passing through the inductors so that a resulting and possibly disadvantageous direct current can be avoided.

The features as described in the above description, claims and Figures can be related to the invention in any combination.

I claim:

1. A method of inductively transmitting energy and information between an energy transmitter comprising a primary inductor and an energy receiver comprising a secondary inductor, wherein energy is transmitted from the energy transmitter to the energy receiver by applying an alternating voltage to the primary inductor to generate a primary alternating current in the primary inductor, thereby inducing a secondary alternating current in the secondary inductor, the method comprising
   transmitting information from the energy transmitter to the energy receiver essentially only in a dedicated first section of the cycle of the alternating voltage by varying the amplitude of the alternating voltage; and
   transmitting information from the energy receiver to the energy transmitter essentially only in a dedicated second section of the cycle by varying the secondary inductor's power absorption, the second section not overlapping with the first section.

2. The method according to claim 1, wherein the first section is located essentially in the positive alternation of the secondary alternating current; and the second section is located essentially in the negative alternation of the alternating voltage.

3. The method according to claim 2, wherein the second section is essentially the entire negative alternation of the secondary alternating current.

4. The method according to claim 2, wherein the first section is essentially the entire positive alternation of the alternating voltage.

5. The method according to claim 1, wherein the alternating voltage has a stepped wave form, the wave form essentially comprising a square-shaped positive alternation and a square-shaped negative alternation.

6. The method according to claim 5, wherein the first section for transmission of information from the primary inductor to the secondary inductor, is located at the end of an alternation of the alternating voltage applied to the primary inductor.

7. The method according to claim 6, wherein the first section is varied by applying for the duration of the first section an essentially zero voltage to the primary inductor.

8. The method according to claim 6, wherein the first section for transmission from the primary inductor to the secondary inductor is located at the end of the positive alternation of the alternating voltage and the second section for transmission from the secondary inductor to the primary inductor is located at the beginning of the negative alternation of the secondary alternating current.

9. The method according to claim 5, wherein the second section for transmission of information from the secondary inductor to the primary inductor is located at the beginning of an alternation of the secondary alternating current.

10. The method according to claim 9, wherein the second section is varied by essentially disconnecting the secondary inductor from a load for the duration of the second section.

11. An energy transmitter comprising a primary inductor that can be coupled inductively to an energy receiver's secondary inductor for inductively transmitting energy to the energy receiver and receiving information from the energy receiver, the energy transmitter comprising means for applying an alternating voltage to the primary inductor for generating a primary alternating current in the primary inductor so that the primary alternating current can induce a secondary alternating current in the secondary inductor, wherein the means for applying an alternating voltage to the primary inductor comprise means for applying a positive voltage across the primary inductor and means for applying a negative voltage across the primary inductor, wherein the means for applying a negative voltage across the primary inductor are provided with means for detecting variations in the power absorption of the secondary inductor.

12. The energy transmitter according to claim 11, wherein means for applying an alternating voltage to the primary inductor comprise an H-bridge circuit with two switches for applying a positive voltage across the primary inductor and two further switches for applying a negative voltage across the primary inductor.

13. An energy receiver comprising a secondary inductor that can be coupled inductively to an energy transmitter's primary inductor for inductively receiving energy and information from the energy transmitter, the energy receiver comprising a rectifier for rectifying a secondary alternating current induced into the secondary inductor by the primary inductor, wherein the circuitry of the rectifier passing the positive alternation of the secondary alternating current is provided with means for detecting variations in the secondary alternating current.

14. The energy receiver according to claim 13, wherein
   the circuitry of the rectifier passing the negative alternation of the secondary alternating current is provided with means for varying the current through the secondary inductor during the negative alternation of the secondary alternating current.

15. A system comprising at least one energy transmitter and at least one energy receiver, the energy transmitter comprising a primary inductor that can be coupled inductively to an energy receiver's secondary inductor for inductively transmitting energy to the energy receiver and receiving information from the energy receiver, the energy transmitter comprising means for applying an alternating voltage to the primary inductor for generating a primary alternating current in the primary inductor so that the primary alternating current can induce a secondary alternating current in the secondary inductor, wherein the means for applying an alternating voltage to the primary inductor comprise means for applying a positive voltage across the primary inductor and means for applying a negative voltage across the primary inductor, wherein the means for applying a negative voltage across the primary inductor are provided with means for detecting variations in the power absorption of the secondary inductor; and the energy receiver comprising a secondary inductor that can be coupled inductively to an energy transmitter's primary inductor for inductively receiving energy and information from the energy transmitter, the energy receiver comprising a rectifier for rectifying a secondary alternating current induced into the secondary inductor by the primary inductor, wherein the circuitry of the rectifier passing the positive alternation of the secondary alternating current is provided with means for detecting variations in the secondary alternating current.

16. The system according to claim 15, wherein in the energy transmitter the means for applying an alternating voltage to the primary inductor comprise an H-bridge circuit with two switches for applying a positive voltage across the primary inductor and two further switches for applying a negative voltage across the primary inductor.

17. The system according to claim 15, wherein in the energy receiver the circuitry of the rectifier passing the negative alternation of the secondary alternating current is provided with means for varying the current through the secondary inductor during the negative alternation of the secondary alternating current.

18. The system according to claim 15, wherein the primary and secondary inductors are coupled by means of a metal core, which can provide for a closed magnetic loop.

* * * * *